US011125345B2

United States Patent
Lin et al.

(10) Patent No.: US 11,125,345 B2
(45) Date of Patent: Sep. 21, 2021

(54) FLOW CONTROL DEVICE

(71) Applicant: Zhejiang Sanhua Intelligent Controls Co., Ltd., Shaoxing (CN)

(72) Inventors: Long Lin, Zhejiang (CN); Yumin Yu, Zhejiang (CN); Zhi Wu, Zhejiang (CN); Junchao Zhang, Zhejiang (CN)

(73) Assignee: Zhejiang Sanhua Intelligent Controls Co., Ltd., Zhejiang (CN)

( * ) Notice: Subject to any disclaimer, the term of this patent is extended or adjusted under 35 U.S.C. 154(b) by 0 days.

(21) Appl. No.: 16/464,925

(22) PCT Filed: Nov. 28, 2017

(86) PCT No.: PCT/CN2017/113308
§ 371 (c)(1),
(2) Date: May 29, 2019

(87) PCT Pub. No.: WO2018/099359
PCT Pub. Date: Jun. 7, 2018

(65) Prior Publication Data
US 2020/0011437 A1 Jan. 9, 2020

(30) Foreign Application Priority Data

Nov. 29, 2016 (CN) .......................... 201611067815.7
Nov. 29, 2016 (CN) .......................... 201611068140.8

(51) Int. Cl.
*F16K 11/074* (2006.01)
*F16K 11/085* (2006.01)
(Continued)

(52) U.S. Cl.
CPC ........ *F16K 11/074* (2013.01); *F16K 11/0856* (2013.01); *F16K 27/04* (2013.01);
(Continued)

(58) Field of Classification Search
CPC ... F16F 1/38; F16K 11/0876; F01P 2007/146; F01P 7/14
See application file for complete search history.

(56) References Cited

U.S. PATENT DOCUMENTS 715,266 A * 12/1902 Heston .................. B62D 5/083
137/625.23
3,430,919 A 3/1969 Frazier
(Continued)

FOREIGN PATENT DOCUMENTS

CN 2212695 Y 11/1995
CN 101532570 A 9/2009
(Continued)

OTHER PUBLICATIONS

International Search Report and Written Opinion for International Application No. PCT/CN2017/113308, dated Mar. 6, 2018.
(Continued)

*Primary Examiner* — Matthew W Jellett
*Assistant Examiner* — Christopher D Ballman
(74) *Attorney, Agent, or Firm* — Wolf, Greenfield & Sacks, P.C.

(57) ABSTRACT

A flow control device for a heat exchange system. The device includes a housing, a valve core and a transmission element. The housing is formed with an accommodating portion, a first port and a second port, the valve core being at least partially accommodated in the accommodating portion. The housing includes fixing elements and an outer housing, the fixing elements being located on a circumferential inner side of the outer housing, the outer housing and the fixing elements are arranged in a relatively sealing manner, and the valve core and the fixing elements are arranged in a relatively sealing manner. The valve core at least has a first flowing passage. The transmission element drives the valve core to open or close at least one of the first (Continued)

and second ports, thereby improving an internal sealing performance of the product.

18 Claims, 4 Drawing Sheets

(51) Int. Cl.
*F16K 27/04* (2006.01)
*F16K 31/04* (2006.01)
*F16K 41/04* (2006.01)

(52) U.S. Cl.
CPC ............ *F16K 31/04* (2013.01); *F16K 41/046* (2013.01); *F25B 2600/25* (2013.01)

(56) References Cited

U.S. PATENT DOCUMENTS

| | | | |
|---|---|---|---|
| 3,967,811 A | 7/1976 | Keller, III | |
| 4,423,749 A * | 1/1984 | Schmitt | F16K 5/0689 137/315.2 |
| 4,605,036 A * | 8/1986 | Smith | F16K 5/0435 137/327 |
| 4,606,368 A * | 8/1986 | McCafferty | F16K 27/062 137/15.22 |
| 6,196,268 B1 * | 3/2001 | Steiner | F16K 5/0242 137/625.47 |
| 9,523,434 B2 | 12/2016 | Nagahama | |
| 2004/0108006 A1 | 6/2004 | McLane et al. | |
| 2006/0118066 A1 | 6/2006 | Martins | |
| 2013/0075641 A1 | 3/2013 | Morris et al. | |
| 2013/0263949 A1 | 10/2013 | Bartnick et al. | |
| 2014/0090414 A1 * | 4/2014 | McLane | F16K 11/0853 62/510 |
| 2016/0334151 A1 | 11/2016 | Yu | |

FOREIGN PATENT DOCUMENTS

| | | |
|---|---|---|
| CN | 201593626 U | 9/2010 |
| CN | 102563123 A | 7/2012 |
| CN | 102777635 A | 11/2012 |
| CN | 103363155 A | 10/2013 |
| CN | 104197090 A | 12/2014 |
| CN | 104791502 A | 7/2015 |
| CN | 104806779 A | 7/2015 |
| CN | 204664491 U | 9/2015 |
| DE | 32 46 622 A1 | 7/1984 |
| WO | WO 03/006859 A1 | 1/2003 |
| WO | WO 2015/113242 A1 | 8/2015 |

OTHER PUBLICATIONS

First Office Action for Chinese Application No. 201611067815.7, dated Mar. 5, 2019.
First Office Action for Chinese Application No. 201611068140.8, dated Mar. 12, 2019.
Partial Supplementary European Search Report for European Application No. 17877006.1, dated Jun. 17, 2020.
European communication pursuant to Article 94(3) EPC dated Dec. 3, 2021 in connection with European Application No. 17 877 006.1.

* cited by examiner

FLOW CONTROL DEVICE

This application is a national stage filing under 35 U.S.C. 371 of International Patent Application Serial No. PCT/CN2017/113308, filed Nov. 28, 2017, which claims priority to Chinese Patent Application No. 201611067815.7, titled "FLOW RATE CONTROL DEVICE" and filed with the Chinese State Intellectual Property Office on Nov. 29, 2016, and Chinese Patent Application No. 201611068140.8, titled "FLOW RATE CONTROL DEVICE" and filed with the Chinese State Intellectual Property Office on Nov. 29, 2016. The entire contents of these applications are incorporated herein by reference in their entireties.

FIELD

The present application relates to a flow rate control device for electronic control.

BACKGROUND

A thermal management system for an electric vehicle includes a cooling liquid circulation system. The cooling liquid circulation system includes a thermal converter, power electronics, a drive motor, a vehicle-mounted charger, a water storage kettle, an electric water pump, a reversing valve, a heat-radiating tank high-temperature zone, a high-voltage PTC heater and an air-condition radiator. A reversing device is connected circularly by a pipeline, and may be configured to reverse a flow direction of the cooling liquid. For example, a PTC heating device is usually added in a hybrid electric vehicle, to overcome a defect of insufficient residual heat, and the cooling liquid here may be required to be reversed to flow to the PTC heating device. In reversing process to the PTC heating device, the reversing valve is also required to reverse the flow direction of the cooling liquid.

The conventional reversing device for cooling liquid is widely used in the industry of hybrid electric vehicles and pure electric vehicles. However, the inner sealing performance thereof may be degraded after the reversing device being used for a certain time.

SUMMARY

An object of the present application is to provide a flow rate control device having a stable sealing performance.

In order to realize the object described above, the flow rate control device according to the technical solution of the present application is described below. The flow rate control device includes a housing, a valve core and a transmission element. The housing includes an outer housing and an inner housing. The outer housing and the inner housing are relatively fixed. The inner housing is arranged at a circumferential inner side of the outer housing. A partial circumferential outer side of the inner housing and a partial circumferential inner side of the outer housing are sealed relative to each other. The housing includes an accommodating portion, a first port and a second port. The valve core is at least partially accommodated in the accommodating portion. Each of the first port and the second port extends to an inner side wall of the housing inwardly. A partial circumferential outer side of the valve core and a partial circumferential inner side of the inner housing are sealed relative to each other. The valve core at least includes a first circulation channel, and the first circulation channel includes at least one circulation port. The at least one circulation port penetrates a main body portion of the valve core outwardly. Driven by the transmission element, the first port is in communication with the second port through the first circulation channel of the valve core.

The outer housing and the inner housing of the housing are fixed relatively, and the outer housing and the inner housing are sealed relative to each other, to improve an inner sealing performance of the flow rate control device.

A flow rate control device according to another technical solution of the present application is provided. The flow rate control device at least includes a housing and a valve core. The housing includes an accommodating portion, a first port and a second port. The valve core is at least partially arranged in the accommodating portion. A relative sealing is formed between a partial circumferential outer side of the valve core and a partial circumferential inner side of the housing. The valve core includes a main body portion, a first circulation channel and a sealing contact portion. The first circulation channel includes at least one circulation port, and the at least one circulation port penetrates the main body portion outwardly. The valve core is movable with respect to the housing. The first port and the second port are in communication with each other through the first circulation channel. A housing contact portion in contact with the sealing contact portion is provided at the circumferential inner side of the housing. The sealing contact portion and the housing contact portion are relatively sealed against liquid, and the sealing contact portion and the housing contact portion are always in contact with each other during relative movement thereof. The flow rate control device further includes at least two limit arm portions. Each of the limit arm portions includes a mounting hole and an elastic element. The housing is provided with a clamping portion, and an inner side of the clamping portion and a radial circumferential outer side of the elastic element are arranged in a limit manner.

The housing contact portion and the sealing contact portion of the valve core are relatively sealed against liquid, and the housing contact portion and the sealing contact portion are always in contact with each other during relative movement thereof, thereby improving the inner sealing performance of the flow rate control device.

DETAILED DESCRIPTION

Figure 1:
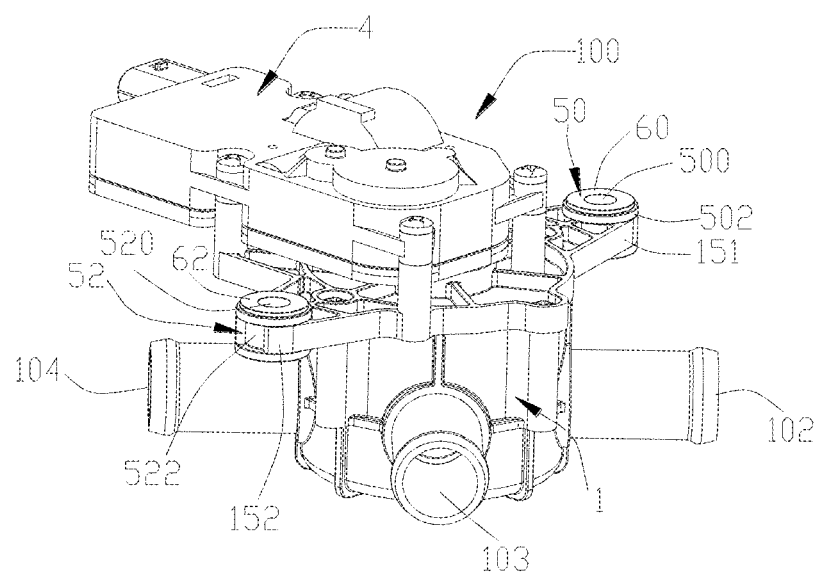
FIG. 1 is a perspective assembled view of a flow rate control device according to an embodiment.
Figure 2:
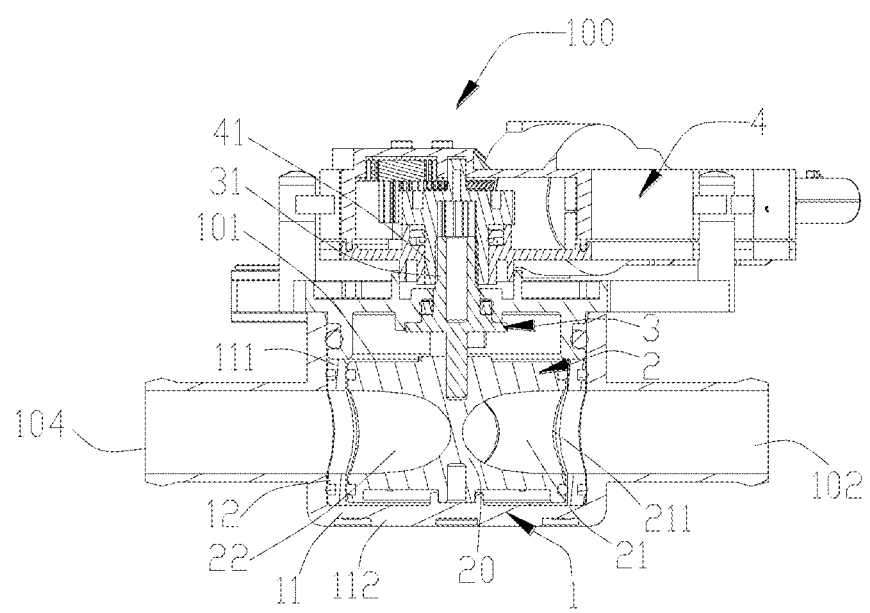
FIG. 2 is a vertical sectional view of the flow rate control device shown in FIG. 1.
Figure 3:
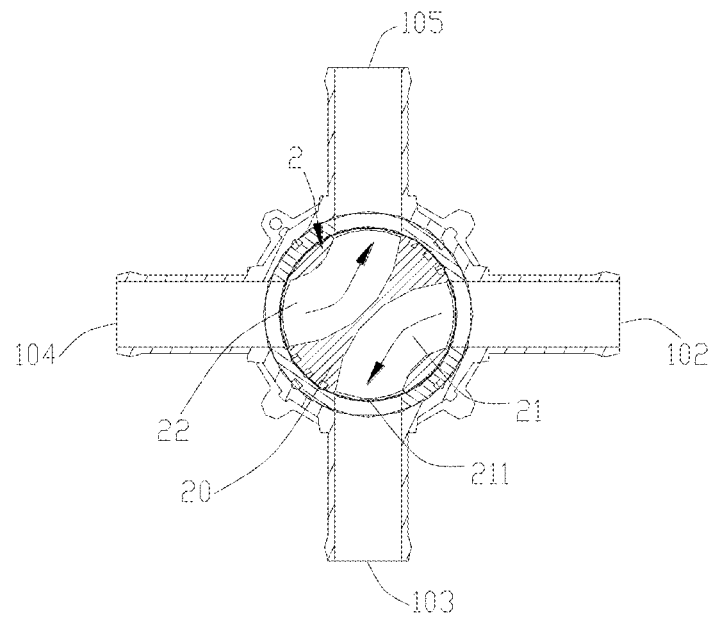
FIG. 3 is a cross sectional view of the flow rate control device shown in FIG. 1 in a working state.
Figure 4:
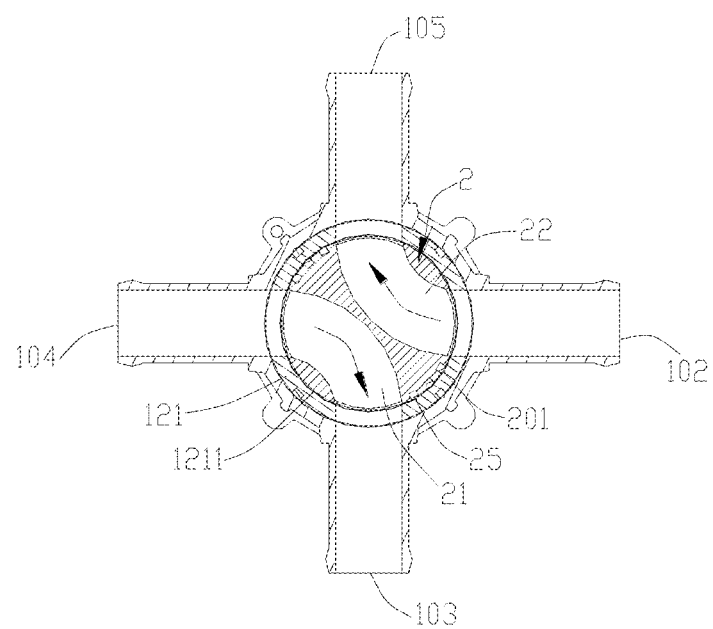
FIG. 4 is a cross sectional view of the flow rate control device shown in FIG. 3 in another working state.

Reference is made to FIG. 1 to FIG. 4. A flow rate control device 100 may be applied to a heat exchange system, for example, an automotive air conditioning system or a domestic air conditioning system. A flow medium of the flow rate control device may be water, a mixture medium of water and other liquids, or a cooling medium having heat-conduction capacity. The flow rate control device 100 is configured to control distribution of the flow medium, and perform heat exchange between the flow medium and other working medium of the heat exchange system, and further to control a medium flow rate of a flow path of the heat exchange system by regulating a flow rate distributed to a medium outlet of the flow rate control device, thereby improving and optimizing a control performance of the flow path of the heat exchange system. Specifically, the flow rate control device 100 can be applied to an air conditioner of the new energy vehicle such as a heating ventilation air conditioner, a battery cooling system or a battery heating system. The flow rate control device 100 is configured to proportionally distribute the working medium from an inlet to different outlets or switches the working medium between different inlets and outlets through a multi-way structure. The flow rate control device 100 may be arranged in two or more heat exchange system circuits. The flow rate control device 100 can switch a flow path in cooperation with the heat exchange system, and can proportionally distribute flow rates of different flow paths of the heat exchange system.

The flow rate control device 100 includes a housing 1, a valve core 2, a transmission element 3 and a control component 4. The housing 1 includes an outer housing 11 and a fixing element 12. The fixing element 12 herein is served as an inner housing, or may be referred to as an inner housing relative to the outer housing. The outer housing 11 and the fixing element 12 are relatively fixed. The fixing element 12 is arranged at a circumferential inner side of the outer housing 11. A fixing region for retaining the fixing element 12 is formed at the circumferential inner side of the outer housing 11. The outer housing 11 and the fixing element 12 may be relatively fixed by being assembled or being insert-molded. That is, the outer housing 11 and the fixing element 12 may be assembled to be fixed in a limit manner, or may be insert-molded to be fixed together. A partial circumferential outer side of the fixing element 12 and a partial circumferential inner side of the outer housing 11 are sealed relative to each other, and specifically the circumferential outer side of the inner housing and the circumferential inner side of the outer housing are relatively sealed against liquid, especially against liquid or other two-phase state medium of gas and liquid, to prevent excess inner leakage between two adjacent ports and allow little leakage. The control component 4 is configured to provide a driving force to drive the transmission element 3 to move, and the valve core 2 is driven by the transmission element 3. A partial radial outer periphery of the transmission element 3 and an inner wall of a mounting hole of the outer housing 11 corresponding to the transmission element 3 are sealed relative to each other. The transmission element 3 is provided with a transmission inputting portion 31 extending outwardly from the outer housing 11. The transmission inputting portion 31 is assembled with a transmission outputting portion 41 of the control component. A driving force is transmitted to the valve core 2 through the transmission component 3.

An accommodating portion 101, a first port 102 and a second port 103 are formed in the housing 1. The first port and the second port are in communication with the accommodating portion. That is, each of the first port and the second port extends inwardly to an inner side wall of the housing, and penetrates the inner side wall of the housing, to be communication with the accommodating portion. The valve core 2 is at least partially accommodated in the accommodating portion 101. A partial circumferential outer side of the valve core 2 and a partial circumferential inner side of the fixing element 12 are relatively sealed. The valve core 2 includes a main body portion 20, a first circulation channel 21 and a sealing contact portion. The sealing contact portion and a partial circumferential inner side of the housing are relatively sealed in a case that the sealing contact portion is in a dynamic contact with the partial circumferential inner side of the housing. A housing contact portion in contact with the sealing contact portion is arranged at a circumferential inner side of the housing 1. Specifically, a dynamic-contact sealing structure is formed by the sealing contact portion and the housing contact portion. That is, during relative movement of the sealing contact portion and the housing contact portion, the sealing contact portion and the housing contact portion are always in contact with each other, and the sealing contact portion and the housing contact portion are relatively sealed against liquid, to ensure a reliable liquid sealing in a moving process of the valve core. Driven by the transmission element 3, the valve core 2 rotates in the accommodating portion 101, so that the first port 102 may be or not be in communication with the second port 103. Specifically, through the valve core 2, the first port 102 may be in communication with the second port 103, or at least one of the first port 102 and the second port 103 may be closed, and/or the opening degree of the first port 102 and the second port 103 may be regulated, that is, the first port or the second port or communication between the first port and the second port may be at least partially blocked by a circumferential side wall portion of the valve core, to cut off the communication between the first port and the second port, and open or close the first port and the second port. Or, an equivalent flow area of the first port or the second port is blocked to be the minimum, to accurately control the flow rate of the medium. The first port 102 and the second port 103 are in communication through a first circulation channel 21. One of the first port 102 and the second port 103 is an inlet, and the other of the first port 102 and the second port 103 is an outlet, to realize a one-inlet one-outlet control mode. The housing 1 may further include more than three ports in other embodiment, to realize a one-inlet two-outlet fluid control mode, a two-inlet multi-outlet fluid control mode, a two-inlet one-outlet fluid control mode and/or a three-inlet two-outlet fluid control mode. During rotation of the valve core 2, two adjacent ports are in communication with each other through the first circulation channel 21. Also, a flow rate of the inlet and the outlet may be controlled by controlling a rotation angle of the valve core, to realize reversing of the working medium and flow-rate control through rotation of the valve core, thus having multipurpose and facilitating generalized usage.

Figure 5:
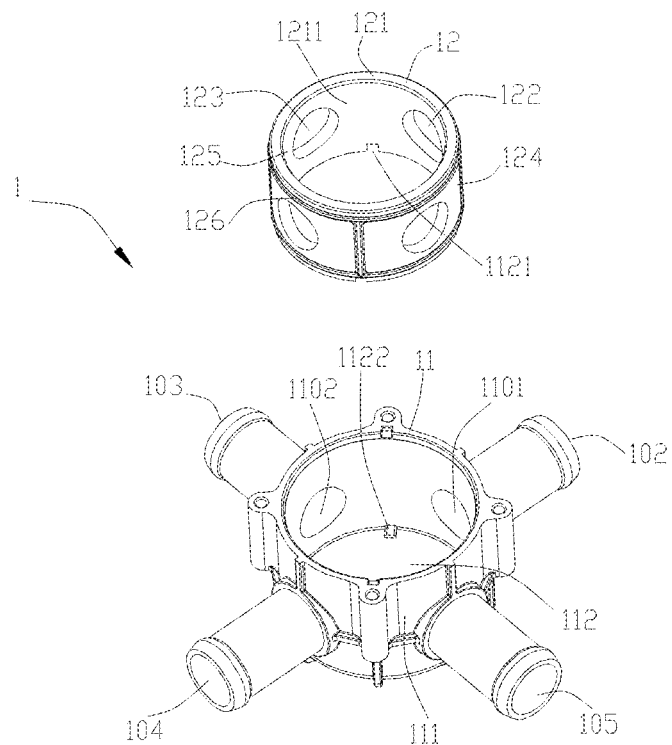
FIG. 5 is a cross sectional view of an outer housing of the flow rate control device shown in FIG. 1.
Figure 6:
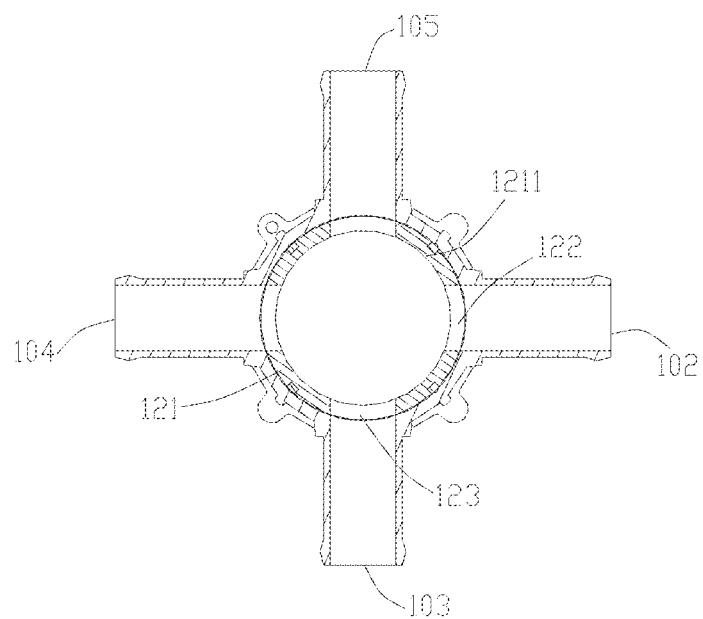
FIG. 6 is a perspective top view of the outer housing of the flow rate control device shown in FIG. 5.
Figure 7:
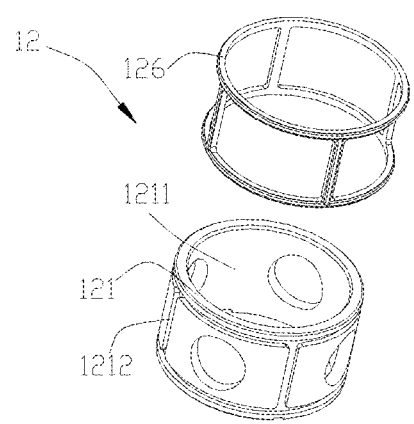
FIG. 7 is an exploded perspective view of an inner housing of the flow rate control device shown in FIG. 5.

In conjunction with FIG. 5 and FIG. 7, the housing 1 includes a side wall 111 and a bottom wall 112. At least a part of the accommodating portion 101 is formed by the side wall and the bottom wall. The first port 102 and/or the second port 103 are higher than the bottom wall 112. The first circulation channel 21 has at least one circulation port 211. For example, the first circulation channel 21 has one or two circulation ports. The at least one circulation port penetrates the main body portion 20 outwardly. The valve core 2 is rotatable between a first position and a second position with respect to the housing. In a case that the valve core 2 is located at the first position, the circulation port 211 is in communication with the first port and the second port, and the first port and/or the second port has a maximum opening degree. In a case that the valve core 2 is located at the second position, the valve core closes the first port and/or the second port, or the first port and/or the second port has a minimum opening degree. The minimum opening degree is zero or close to zero. In a case that the valve core 2 moves between the first position and the second position, the valve core opens a part of at least one of the first port and the second port. An opening degree of at least one of the first port and the second port can be regulated through rotation of the valve core. Further, a center of the first port is located at the same height reference as that of the second port, so that a flow resistance of the fluid in the first circulation channel is the smallest. Further, the valve core 2 may have a second circulation channel 22. The second circulation channel 22 has at least one circulation port. The housing further includes a third port 104 and a fourth port 105. The first port, the second port, the third port and the fourth port are arranged sequentially in a clockwise direction or an anticlockwise direction. The first port, the second port, the third port and the fourth port are symmetrically arranged at a circumferential side of the valve core relative to the center of the housing. The valve core 2 is driven by the transmission element, in the case that the valve core 2 is located at the first position, the first port 102 is in communication with the second port 103 through the first circulation channel 21, and the third port 104 is in communication with the fourth port 105 through the second circulation channel 22. In the case that the valve core 2 is located at the second position, the valve core 2 can allow the communication between the third port 104 and the second port 103, and allow the communication between the first port 102 and the fourth port 105. A flow direction of the working medium can be switched through rotation of the valve core 2. Specifically, the first port 102 and the third port are arranged oppositely as outlets, and the second port and the fourth port are arranged oppositely as inlets. Alternatively, the first port 102 and the third port are arranged oppositely as inlets, and the second port and the fourth port are arranged oppositely as outlets, so that the outlets and the inlets can be switched successfully during clockwise rotation or anticlockwise rotation of the valve core.

The housing 1 is further described below. The fixing element 12 has a main body base 121, a first valve port 122 and a second valve port 123. The fixing element 12 further includes a first stopping portion 124 and a second stopping portion 125. In a circumferential rotation direction of the valve core, the first stopping portion 124 is arranged at one side of the first valve port 122, and the second stopping portion 125 is arranged at one side of the second valve port 123. The first stopping portion and the second stopping portion as part of the main body base are arranged corresponding to an inner wall of the housing, to simplify integral construction of the housing 1, and facilitate assembling or molding. A contact curved surface is formed at a circumferential inner side of the main body base. The main body base 121 is approximately annular. The first valve port 122 and the second valve port 123 penetrate the main body base 121 along a radial direction of the valve core. The first valve port is a part of the first port 102, and the second valve port 123 is a part of the second port 103. A first block portion and a second block portion are formed by the valve core 2. In a case that the valve core 2 is located at the second position or the valve core is located between the first position and the second position, the first block portion overlaps with at least a part of the first port, and the second block portion overlaps with at least a part of the second port 103. That is, the first circulation channel can partially open the first port and/or the second port. The valve core 2 at least partially cuts off the communication between the first port and the second port by the first block portion and the second block portion.

The outer housing 11 includes a first pipe orifice 1101 corresponding to the first valve port 122 of the valve core and a second pipe orifice 1102 corresponding to the second valve port of the valve core. The first pipe orifice 1101 and the second pipe orifice 1102 are formed on a side wall 111 of the housing. A diameter of the first valve port may be the same as or different from a diameter of the first pipe orifice. For convenience of manufacturing, a flow area of the first valve port is greater than a flow area of the first pipe orifice, or a flow area of the first valve port is less than or equal to a flow area of the first pipe orifice. And/or, a diameter of the second valve port may be the same as or different from a diameter of the second pipe orifice. For convenience of manufacturing, a flow area of the second valve port is greater than a flow area of the second pipe orifice, or a flow area of the second valve port is less than or equal to a flow area of the second pipe orifice. Furthermore, one of the housing and the valve core is provided with a limit recess, and the other of the housing and the valve core is provided with a limit protrusion matching with the limit recess. Specifically, the housing is provided with a limit recess, the main body portion 20 of the valve core has a top side and a bottom side. The limit protrusion is arranged on the bottom side of the main body portion. The limit protrusion matches with the limit recess to circumferentially position the valve core.

Figure 8:
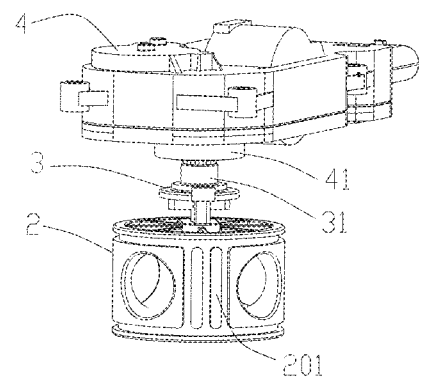
FIG. 8 is a perspective assembled view of a control component and a valve core of the flow rate control device shown in FIG. 1.
Figure 9:
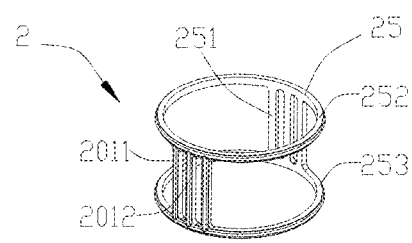
FIG. 9 is an exploded perspective view of the valve core in FIG. 1 according to another embodiment.
Figure 9:
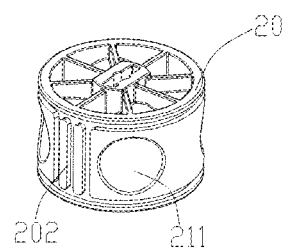

Reference is further made to FIG. 8 and FIG. 9, a static sealing structure is formed between a circumferential outer side of the main body base 121 and a part of a circumferential inner side of the outer housing 11. The static sealing structure here refers to a relative sealing formed between the main body base 121 and the partial circumferential inner side of the outer housing 11 in the case that the main body base 121 and the partial circumferential inner side of the outer housing 11 are in a static contact, and the sealing is mainly against liquid. A sealing performance between the valve core and the outer housing can be improved by arranging the fixing element. The fixing element 12 has a first sealing contact portion 1211 arranged corresponding to the valve core. The first sealing contact portion 1211 has an arc-shaped contact surface. The arc-shaped contact surface can be in contact with the sealing contact portion of the valve core. The first sealing contact portion is formed at a circumferential inner side of the fixing element. The first sealing contact portion 1211 is arranged to be in contact with the circumferential outer side of the valve core 2. Correspondingly, a second sealing contact portion 201 is arranged at the circumferential outer side of the valve core 2. The second sealing contact portion abuts against the first sealing contact portion, to dynamically seal the valve core 2 and, the outer housing 11 and/or the fixing element 12. It can be understood that, the second sealing contact port 201 is served as a sealing contact portion of the valve core 2. Further, the valve core 2 includes a sealing element 25. The main body portion 20 includes a fixing recess 202 such as an annular sealing ring or a shaped sealing ring. The sealing element 25 is assembled or embedded with the main body portion 20. The sealing element 25 includes a fixing base 251 which is partially accommodated in the fixing recess 202. Another part of the sealing element 25 is formed by the sealing contact portion 201 of the valve core 2. The sealing contact portion 201 of the valve core 2 protrudes out from the fixing recess, and is in a good contact with the first sealing contact portion of the fixing element for sealing. The sealing contact portion 201 of the valve core 2 has a dual-sealing structure or a multi-sealing structure. The sealing contact portion of the valve core 2 includes a first contact portion 2011 and a second contact portion 2012. The first contact portion 2011 and the second contact portion 2012 are arranged adjacently. The first contact portion 2011 and the second contact portion are at the same side as the at least one circulation port 211. A sealing performance between the outer side of the valve core and the peripheral structure can be improved by arranging the sealing contact portions of the valve core. Especially in a case that the sealing contact portion of the valve core 2 is arranged as a dual-sealing contact structure or a multi-sealing contact structure, the flow rate control device has a long service life. The flow rate control device can have a good inner sealing performance even in case of deformation or aging of a part of structure due to long-time working or a poor working condition of the flow rate control device, thereby reducing harmful effect caused by the degrading of the sealing performance.

The sealing element 25 includes a first sealing connection portion 252 and a second sealing connection portion 253. The first sealing connection portion has an annular structure, and the second sealing connection portion has an annular structure. The first sealing connection portion and the second sealing connection portion are arranged approximately in parallel. Therefore, the sealing element 25 has a shaped sealing ring structure. The first sealing connection portion 252 and the second sealing connection portion 253 are respectively arranged integrally with the sealing contact portion 201 of the valve core 2. The sealing contact portion 201 of the valve core 2 is arranged to intersect with the first sealing connection portion or the second sealing connection portion. As described above, a relative dynamic sealing can be formed by the sealing contact portion of the valve core 2 and the housing contact portion at the circumferential inner side of the housing, so that during the relative movement of the valve core 2 and the housing, the valve core 2 and the circumferential inner side of the housing are always in contact with each other, and are sealed against liquid. The outer housing 11 and the fixing element 12 are assembled together, and specifically the housing contact portion may be formed by the fixing element 12 or by both the outer housing 11 and the fixing element 12. In other embodiment, the fixing element is partially inserted into the outer housing 11; and the housing contact portion is formed by the outer housing or the fixing element, or by both the outer housing and the fixing element. An inner side surface of the fixing element is at least exposed outside an inner side surface of the outer housing, and the fixing element and the outer housing are embedded together to position the fixing element and the outer housing. A part of the fixing element exposed outside the inner side of the outer housing forms a contact part for sealing with respect to the valve core, to simplify a sealing structure between the fixing element and the valve core. For example, the fixing element is not provided in other embodiment, and the valve core is directly assembled with the outer housing, so that the sealing contact portion of the valve core can be in contact with the outer housing 11 for sealing. And correspondingly, a housing contact portion is formed by the outer housing 11, the outer housing is in a clearance fit with the valve core, so that the valve core is movable well with respect to the outer housing. And the outer housing and the sealing contact portion are relatively sealed. The outer housing is provided with an arc-shaped contact surface in contact with the sealing contact portion. The sealing contact portion and the main body portion are relatively fixed, and are rotatable with respect to the outer housing.

In other embodiment, the valve core may be molded integrally by using ceramic or organic glass, metal or other material. Or, a sealing contact structure made of ceramic, organic glass, metal or other material is embedded on an outer side of the valve core 2. Specifically, the sealing contact portion of the valve core 2 protrudes outwardly along a radial direction of the valve core from the main body portion 20. That is, the sealing contact portion of the valve core 2 is embedded to the main body portion 20, or the sealing contact portion of the valve core 2 is integrated with the main body portion 20. The sealing contact portion of the valve core 2 is a ceramic arc-shaped contact surface, a metal arc-shaped contact surface, or an organic-glass arc-shaped contact surface. A surface roughness of the arc-shaped contact surface is greater than 0.03 μm and less than 0.48 μm. The arc-shaped contact surface is smooth, to satisfy a sealing contact performance.

Driven by the transmission element, the valve core 2 rotates to-and-fro along a circumferential inner side of the fixing element 12. A dynamic sealing is arranged between the valve core and the first sealing contact portion 1211 of the fixing element. That is, the valve core 2 is always in contact with the fixing element (the inner housing) during the relative movement of the valve core 2 and the fixing element, and the valve core 2 and the fixing element are relatively sealed against liquid. Along a radial direction of the valve core, the roughness of the valve core may be substantially the same as or different from the roughness of the fixing element. The roughness of the circumferential inner side of the fixing element is less than or equal to or greater than the roughness of the circumferential outer side of the valve core. Specifically, the surface roughness of the first sealing contact portion 1211 is greater than 0.03 μm and less than 0.48 μm, and the surface roughness of the circumferential outer side of the valve core is greater than 0.03 μm and less than 0.48 μm. With such arrangement, the roughness of the inner side of the fixing element and the roughness of the outer side of the valve core can meet a dynamic sealing requirement of the fixing element and the valve core.

Specifically, the main body base 121 of the fixing element 12 has a ceramic annular structure, a metal annular structure, or an organic-glass annular structure. The fixing element 12 is assembled with the outer housing 11. The fixing element is in a clearance fit with the outer housing. One of the outer housing 11 and the fixing element 12 has a stopping groove 1121, and the other of the outer housing 11 and the fixing element 12 has a stopping protrusion 1122. The stopping protrusion 1122 is inserted into the stopping groove 1121 along an axial direction of the fixing element, and the stopping protrusion is in a clearance fit with the stopping groove, so that the valve core can be successfully rotated. The flow rate control device 100 further includes a sealing element 126. The sealing element 126 is clamped between the fixing element 12 and the outer housing 11, so that the fixing element and the outer housing are relatively sealed by the sealing element. The fixing element 12 or the outer housing 11 has an accommodating groove, so that the sealing element 126 is partially accommodated in the accommodating groove. In this embodiment, an accommodating groove 1212 is formed at an outer side of the fixing element 12. An outer ring of the sealing element 126 is used to seal the outer housing, to form a shaped sealing structure. The sealing element 126 includes a fixing portion 1261 and a sealing portion. The fixing portion and the sealing portion are connected integrally. The fixing portion 1261 is accommodated in the accommodating groove. The sealing portion protrudes from the accommodating groove, and the sealing portion is sealed relative to the outer housing. The sealing element 126 includes a first sealing portion 1262, a second sealing portion 1263 and a third sealing portion 1264 in this embodiment. The first sealing portion 1262, the second sealing portion 1263 and the third sealing portion 1264 are arranged integrally. The first sealing portion 1262 and the second sealing portion 1263 are arranged approximately in parallel, and the third sealing portion 1264 is arranged to intersect with the first sealing portion 1262 or the second sealing portion 1263.

The flow rate control device 100 in this embodiment further includes at least two limit arm portions 50 and 52. The flow rate control device can be connected to a suspension system of the vehicle system or an intermediate connection member through the limit arm portions, to mount the flow rate control device on the vehicle. One of the limit arm portions includes a first mounting hole 500 and a first elastic element 502. The other of the limit arm portions includes a second mounting hole 520 and a second elastic element 522. The housing 1 includes a first clamping portion 151 and a second clamping portion 152. Inner sides of the first clamping 151 and the second clamping portion 152 are stopped against radial circumferential outer sides of the elastic elements respectively, to prevent the elastic elements from disengaging from the housing due to an external pull-out force. The flow rate control device further includes a fixing hoop 60. The first mounting hole 500 is arranged at a radial circumferential inner side of the fixing hoop. The radial circumferential inner side of the first elastic element is fixed with a radial circumferential outer side of the fixing hoop. The flow rate control device further includes another fixing hoop 62. In a case that a mating portion is inserted into the second mounting hole, the fixing hoop 62 is in direct contact with or is connected to and limited by the mating portion. Elastic deformation may occur to the elastic element due to being extruded by an external force, to provide an elastic buffer for the flow rate control device. Specifically, the fixing hoop may be a metal hoop, and has a high strength. The elastic elements 502 and 522 are elastic washers, which can reduce vibration on the flow rate control device caused by vibration of the vehicle, and provide relative buffer. Specifically, the elastic elements 502 and 522 are elastic rubber washers, elastic silica-gel washers or elastic metal washers. Circumferential inner sides of the two elastic washers abut against circumferential outer sides of the fixing hoops 60 and 62, respectively. The two fixing hoops surround to form the mounting holes 500 and 520 respectively. Elastic deformation provided by the above two elastic washers can reduce indirect vibration on the components of the flow rate control device due to vibration of the vehicle, to optimize a working environment of the flow rate control device.

It should be illustrated that the above embodiments are only intended to illustrate the present application rather than limit the technical solutions described in the present application. Although the present application is illustrated in detail in the specification with reference to the above embodiments, those skilled in the art can understand that modification or equivalent substitution can be made to the present application by those skilled in the art, and technical solutions and improvement thereof without deviating from the spirit and the scope of the present application all fall within the scope defined by the claims of the present application.

What is claimed is:

1. A flow rate control device, comprising:
    a housing,
    a valve core, and
    a transmission element, wherein
    the housing comprises an outer housing and an inner housing, the outer housing and the inner housing are relatively fixed, the inner housing is arranged at a circumferential inner side of the outer housing, a partial circumferential outer side of the inner housing and a partial circumferential inner side of the outer housing are sealed relative to each other;
    the housing comprises an accommodating portion, a first port and a second port, the valve core is at least partially accommodated in the accommodating portion, each of the first port and the second port extends inwardly to an inner side wall of the housing, a partial circumferential outer side of the valve core and a partial circumferential inner side of the inner housing are sealed relative to each other; and
    the valve core comprises a first circulation channel, the first circulation channel comprises at least one circulation port, the at least one circulation port penetrates a main body portion of the valve core outwardly, and driven by the transmission element, the first circulation channel of the valve core allows the first port to be in communication with the second port,
    wherein the inner housing comprises a main body base, a first valve port and a second valve port, the main body base is approximately annular, each of the first valve port and the second valve port penetrates the main body base in a radial direction of the valve core;
    a relative sealing structure is formed between a partial circumferential outer side of the main body base and an circumferential inner side of the outer housing, the inner housing is provided with a first sealing contact portion arranged corresponding to the valve core, the first sealing contact portion is formed at a circumferential inner side of the inner housing, the first sealing contact portion is arranged to be in contact with the circumferential outer side of the valve core;
    driven by the transmission element, the valve core rotates to-and-fro along the circumferential inner side of the inner housing, the valve core is sealed relative to the first sealing contact portion, and along a radial direction of the valve core, the roughness of the circumferential inner side of the inner housing is less than, equal to or greater than the roughness of the circumferential outer side of the valve core,
    wherein a surface roughness of the first sealing contact portion is greater than 0.03 μm and less than 0.48 μm, and
    a second sealing contact portion is provided at the circumferential outer side of the valve core, the second sealing contact portion abuts against the first sealing contact portion, and the surface roughness of the circumferential outer side of the valve core is greater than 0.03 μm and less than 0.48 μm.

2. The flow rate control device according to claim 1, wherein one of the first port and the second port serves as an inlet, and the other of the first port and the second port serves as an outlet;
    the housing comprises a side wall and a bottom wall, at least a part of the accommodating portion is formed by the side wall and the bottom wall, the accommodating portion is provided with an upward opening, the first port and the second port are higher than the bottom wall, the first circulation channel is provided with at least one circulation port; and
    the valve core is rotatable between a first position and a second position with respect to the housing.

3. The flow rate control device according to claim 2, wherein a circumferential outer side of the inner housing and a circumferential inner side of the outer housing are relatively sealed against water, a contact curved surface is formed by an circumferential inner side of the main body base, a circumferential outer side of the main body base is arranged corresponding to the circumferential inner side of the outer housing;

the first valve port serves as a part of the first port, and the second valve port serves as a part of the second port, and the valve core forms a first block portion and a second block portion;

in a case that the valve core is located at the second position or the valve core is located between the first position and the second position, the first block portion overlaps with at least a part of the first port, and the second block portion overlaps with at least a part of the second port, the valve core at least partially cuts off the communication between the first port and the second port.

4. The flow rate control device according to claim 2, wherein the valve core further comprises a second circulation channel, and the second circulation channel is provided with at least one circulation port, the housing further comprises a third port and a fourth port;

in a case that the valve core, driven by the transmission element, is located at the first position, the first port is in communication with the second port through the first circulation channel, and the third port is in communication with the fourth port through the second circulation channel; and in a case that the valve core, driven by the transmission element, is located at the second position, the valve core allows the communication between the third port and the second port, and allows the communication between the first port and the fourth port.

5. The flow rate control device according to claim 4, wherein the first port, the second port, the third port and the fourth port are arranged sequentially in a clockwise direction or an anticlockwise direction, and the first port, the second port, the third port and the fourth port are symmetrically arranged at a circumferential side of the valve core with respect to a center of the housing;

the first port and the third port are arranged symmetrically as inlets, and the second port and the fourth port are arranged symmetrically as outlets; or the first port and the third port are arranged symmetrically as outlets, and the second port and the fourth port are arranged symmetrically as inlets.

6. The flow rate control device according to claim 2, further comprising a control component configured to provide a driving force to drive the transmission element, the valve core is driven by the transmission element; and a radial outer circumference of the transmission element and an inner wall of a mounting hole of the outer housing corresponding to the transmission element are sealed relative to each other, the transmission element is provided with a transmission inputting portion extending outwardly from the outer housing, and the transmission inputting portion is assembled with a transmission outputting portion of the control component, and a circumferential outer side of the valve core and an inner circumferential portion of the inner housing are sealed relative to each other.

7. The flow rate control device according to claim 1, wherein the first valve port serves as a part of the first port, and the second valve port serves as a part of the second port, the outer housing is provided with a first pipe orifice corresponding to the first valve port and a second pipe orifice corresponding to the second valve port.

8. The flow rate control device according to claim 7, wherein a flow area of the first valve port is greater than a flow area of the first pipe orifice, and a flow area of the second valve port is greater than a flow area of the second pipe orifice; or a flow area of the first valve port is less than or equal to a flow area of the first pipe orifice, and a flow area of the second valve port is less than or equal to a flow area of the second pipe orifice; or a flow area of the first valve port is greater than a flow area of the first pipe orifice, and a flow area of the second valve port is less than or equal to a flow area of the second pipe orifice; or a flow area of the first valve port is less than or equal to a flow area of the first pipe orifice, and a flow area of the second valve port is greater than a flow area of the second pipe orifice.

9. The flow rate control device according to claim 1, wherein the main body base has a ceramic annular structure, a metal annular structure or an organic-glass annular structure, the inner housing is assembled with the outer housing and is in clearance fit with the outer housing;

the flow rate control device further comprises a sealing element clamped between the inner housing and the outer housing, the inner housing and the outer housing are relatively sealed through the sealing element;

one of the inner housing and the outer housing is provided with a stopping groove, and the other of the inner housing and the outer housing is provided with a stopping protrusion, and along an axial direction of the inner housing, the stopping protrusion is inserted into the stopping groove and is in clearance fit with the stopping groove; or the inner housing is partially embedded into the outer housing, and an inner side surface of the inner housing is exposed outside an inner side surface of the outer housing.

10. The flow rate control device according to claim 1, wherein the valve core further comprises a main body portion and a sealing contact portion, the valve core is movable with respect to the housing, the first port and the second port are in communication with each other through the first circulation channel, a housing contact portion in contact with the sealing contact portion is provided at the circumferential inner side of the housing, the sealing contact portion and the housing contact portion are relatively sealed against liquid, and the sealing contact portion and the housing contact portion are always in contact with each other during relative movement; and the flow rate control device further comprises at least two limit arm portions, each of the limit arm portions comprises a mounting hole and an elastic element, the housing is provided with a clamping portion, and an inner side of the clamping portion and a radial circumferential outer side of the elastic element are limited by each other.

11. The flow rate control device according to claim 10, wherein the housing comprises an outer housing and an inner housing, the outer housing and the inner housing are fixed with respect to each other, the inner housing is arranged at a circumferential inner side of the outer housing, the inner housing and the outer housing are sealed relative to each other, a partial circumferential inner side of the inner housing and the sealing contact portion are sealed relative to each other, and the inner housing is provided with an arc-shaped contact surface in contact with the sealing contact portion;

or, the housing comprises an outer housing, the valve core is assembled with the outer housing and is in a clearance fit with the outer housing, a partial circumferential inner side of the outer housing and the sealing contact portion are sealed relative to each other, the circumferential inner side of the outer housing is provided with an arc-shaped contact surface in contact with the sealing contact portion, the sealing contact portion and the main body portion are fixed relative to each other, and the sealing contact portion and the main body portion rotate with respect to the outer housing; and the flow rate control device further comprises a fixing hoop, the mounting hole is arranged at a radial inner circumferential side of the fixing hoop, and a radial inner circumferential side of the elastic element and a radial outer circumferential side of the fixing hoop are fixed.

12. The flow rate control device according to claim 11, wherein the sealing contact portion is arranged to protrude outwardly from the main body portion along a radial direction of the valve core, and the sealing contact portion is embedded to the main body portion, or the sealing contact portion is integrated with the main body portion; and the sealing contact portion is a ceramic arc-shaped contact surface, a metal arc-shaped contact surface or an organic-glass arc-shaped contact surface, and a surface roughness of the arc-shaped contact surface is greater than 0.03 μm and less than 0.48 μm.

13. The flow rate control device according to claim 12, comprising a transmission element, wherein:

driven by the transmission element, the valve core allows the communication between the first port and the second port through the at least one circulation port, or the valve core closes at least one of the first port and the second port through the main body portion, and/or the valve core regulates an opening degree of the first port and the second port;

the housing comprises an outer housing, the valve core is assembled with the outer housing, and one of the outer housing and the valve core is provided with a limit recess, and the other of the outer housing and the valve core is provided with a limit protrusion matching with the limit recess, and the outer housing forms the limit recess; and the main body portion has a top side and a bottom side, the limit protrusion is arranged at the bottom side of the main body portion, and the limit protrusion matches with the limit recess to circumferentially position the valve core.

14. The flow rate control device according to claim 13, wherein the housing comprises an outer housing and an inner housing, and the outer housing and the inner housing are relatively fixed, the inner housing is arranged at an circumferential inner side of the outer housing, and a partial circumferential outer side of the inner housing and a partial circumferential inner side of the outer housing are sealed relative to each other, and a partial circumferential inner side of the inner housing and the sealing contact portion are sealed relative to each other, and the inner housing is provided with an arc-shaped contact surface in contact with the sealing contact portion;

the valve core is rotatable between a first position and a second position with respect to the outer housing, the valve core is provided with a second circulation channel, the second circulation channel is provided with at least one circulation port, the housing comprises a third port and a fourth port;

the valve core is rotatable between the first position and the second position with respect to the outer housing;

the first port, the second port, the third port and the fourth port are arranged sequentially along a clockwise direction or an anticlockwise direction, and the first port, the second port, the third port and the fourth port are symmetrically arranged at a circumferential side of the valve core with respect to a center of the housing;

in a case that the valve core driven by the transmission element is located at the first position, the first port is in communication with the second port through the first circulation channel, and the third port is in communication with the fourth port through the second circulation channel; and in a case that the valve core driven by the transmission element is located at the second position, the valve core cuts off the communication between the third port and the fourth port, or in a case that the valve core driven by the transmission element is located at the second position, the valve core allows the communication between the first port and the fourth port, and the valve core allows the communication between the third port and the second port.

15. The flow rate control device according to claim 10, wherein the sealing contact portion is arranged to protrude outwardly from the main body portion along a radial direction of the valve core, and the sealing contact portion is embedded to the main body portion, or the sealing contact portion and the main body portion are formed integrally; or the valve core comprises a sealing member, the sealing member is assembled with the main body portion, the main body portion is provided with a fixing recess, the sealing member is provided with a fixing base which is partially accommodated in the fixing recess, another part of the sealing member is formed by the sealing contact portion, and the sealing contact portion protrudes outwardly from the fixing recess.

16. The flow rate control device according to claim 15, wherein the valve core comprises a sealing member, the sealing member is assembled with or embedded to the main body portion, the sealing member is provided with a fixing base which is partially accommodated in a fixing recess, and another part of the sealing member is formed by the sealing contact portion;

the sealing contact portion protrudes outwardly from the fixing recess, and the sealing contact portion has a dual-sealing structure or a multi-sealing structure; and the sealing contact portion comprises a first contact portion and a second contact portion, and the first contact portion and the second contact portion are arranged adjacently, and the first contact portion and the second contact portion are arranged at the same side of the at least one circulation port.

17. The flow rate control device according to claim 16, wherein the sealing member comprises a first sealing connection portion and a second sealing connection portion, the first sealing connection portion is an annular structure, and the second sealing connection portion is an annular structure, the first sealing connection portion and the second sealing portion are arranged approximately in parallel; and the first sealing connection portion and the sealing contact portion are arranged integrally, and the second sealing connection portion and the sealing contact portion are arranged integrally, the sealing contact portion is arranged to intersect with the first sealing connection portion or the second sealing connection portion.

18. The flow rate control device according to claim 16, wherein the housing comprises an outer housing and an inner housing, and the outer housing and the inner housing are relatively fixed, the inner housing is arranged at a circumferential inner side of the outer housing, and a partial circumferential outer side of the inner housing and a partial circumferential inner side of the outer housing are sealed relative to each other, and a partial circumferential inner side of the inner housing and the sealing contact portion are sealed relative to each other, and the inner housing is provided with an arc-shaped contact surface in contact with the sealing contact portion, and the inner housing comprises a main body portion, and the main body portion has a ceramic annular profile, a metal annular profile or an organic-glass annular profile; or the inner housing is assembled with the outer housing and is in a clearance fit with the outer housing, the flow rate control device further comprises a sealing element, and the inner housing and the outer housing are relatively sealed through the sealing element, the inner housing or the outer housing is provided with an accommodating groove, and the sealing element is partially accommodated in the accommodating groove, the sealing element comprises a fixing portion and a sealing portion, and the fixing portion and the sealing portion are connected integrally, the fixing portion is accommodated in the accommodating groove, and the sealing portion protrudes from the accommodating groove, and the sealing portion and a partial circumferential inner side of the outer housing are sealed relative to each other; and/or the sealing element comprises a first sealing portion, a second sealing portion and a third sealing portion, wherein the first sealing portion, the second sealing portion and the third sealing portion are arranged integrally, the first sealing portion and the second sealing portion are arranged approximately in parallel, and the third sealing portion is arranged to intersect with the first sealing portion or the second sealing portion.

* * * * *